(12) United States Patent
Asakura et al.

(10) Patent No.: US 12,191,730 B2
(45) Date of Patent: Jan. 7, 2025

(54) IN-VEHICLE STRUCTURE OF INVERTER

(71) Applicant: NISSAN MOTOR CO., LTD., Yokohama (JP)

(72) Inventors: Daisuke Asakura, Kanagawa (JP); Kazuhiko Matsumoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 314 days.

(21) Appl. No.: 17/908,636

(22) PCT Filed: Mar. 4, 2020

(86) PCT No.: PCT/JP2020/009191
§ 371 (c)(1),
(2) Date: Sep. 1, 2022

(87) PCT Pub. No.: WO2021/176602
PCT Pub. Date: Sep. 10, 2021

(65) Prior Publication Data
US 2023/0163654 A1 May 25, 2023

(51) Int. Cl.
| | | |
|---|---|---|
| *B62D 25/08* | (2006.01) |
| *B60K 1/02* | (2006.01) |
| *H02K 3/40* | (2006.01) |
| *H02K 3/50* | (2006.01) |
| *H02K 11/33* | (2016.01) |
| *B60K 6/26* | (2007.10) |

(52) U.S. Cl.
CPC ............... *H02K 3/40* (2013.01); *B60K 1/02* (2013.01); *B62D 25/08* (2013.01); *H02K 3/50* (2013.01); *H02K 11/33* (2016.01); *B60K 6/26* (2013.01); *B60Y 2200/92* (2013.01); *H02K 2203/09* (2013.01)

(58) Field of Classification Search
CPC . H02K 3/40; H02K 3/50; H02K 11/33; H02K 2203/09; B60K 1/02; B60K 6/26; B62D 25/08; B60Y 2200/92
See application file for complete search history.

(56) References Cited

U.S. PATENT DOCUMENTS

| | | | | |
|---|---|---|---|---|
| 9,650,075 B2 * | 5/2017 | Murayama | ........... | B62D 21/152 |
| 10,518,811 B2 * | 12/2019 | Harpster | ........... | B62D 25/08 |
| 2016/0121934 A1 | 5/2016 | Murayama | | |

FOREIGN PATENT DOCUMENTS

| | | |
|---|---|---|
| JP | 2012-096746 A | 5/2012 |
| JP | 2013-219862 A | 10/2013 |
| JP | 2016-088230 A | 5/2016 |
| JP | 2019-188884 A | 10/2019 |

* cited by examiner

*Primary Examiner* — John D Walters
(74) *Attorney, Agent, or Firm* — Foley & Lardner LLP

(57) ABSTRACT

The in-vehicle structure of an inverter includes an inverter and a side member. The inverter has a first high-voltage bus bar whose position in the front-rear direction of the vehicle does not overlap with a low rigidity portion and overlaps with a high rigidity portion.

10 Claims, 6 Drawing Sheets

IN-VEHICLE STRUCTURE OF INVERTER

TECHNICAL FIELD

The present invention relates to an in-vehicle structure of an inverter.

BACKGROUND ART

JP2012-96746A discloses a structure in which an inverter is arranged near a side member.

SUMMARY OF INVENTION

The side member has a low rigidity portion, and attenuates energy by deformation at the time of a vehicle collision. However, if the inverter is arranged near the side member, the deformed side member interferes with the inverter and the inverter is thus destroyed, and consequently, there is a risk that a high-voltage terminal connection portion of the inverter is dielectrically broken down, that is, the high-voltage terminal connection portion is short-circuited.

The present invention has been made in view of such a problem, and the object of the present invention is to prevent the dielectric breakdown of the inverter due to interference with the side member at the time of a vehicle collision.

An in-vehicle structure of an inverter according to one embodiment of the present invention includes an inverter, and a side member having a low rigidity portion and a high rigidity portion in a front-rear direction of the vehicle, the high rigidity portion being arranged behind the low rigidity portion. The inverter has a high-voltage terminal connection portion whose position in the front-rear direction of the vehicle does not overlap with the low rigidity portion and overlaps with the high rigidity portion.

DESCRIPTION OF EMBODIMENTS

Embodiments of the present invention will be described below with reference to the accompanying drawings.

Figure 1:
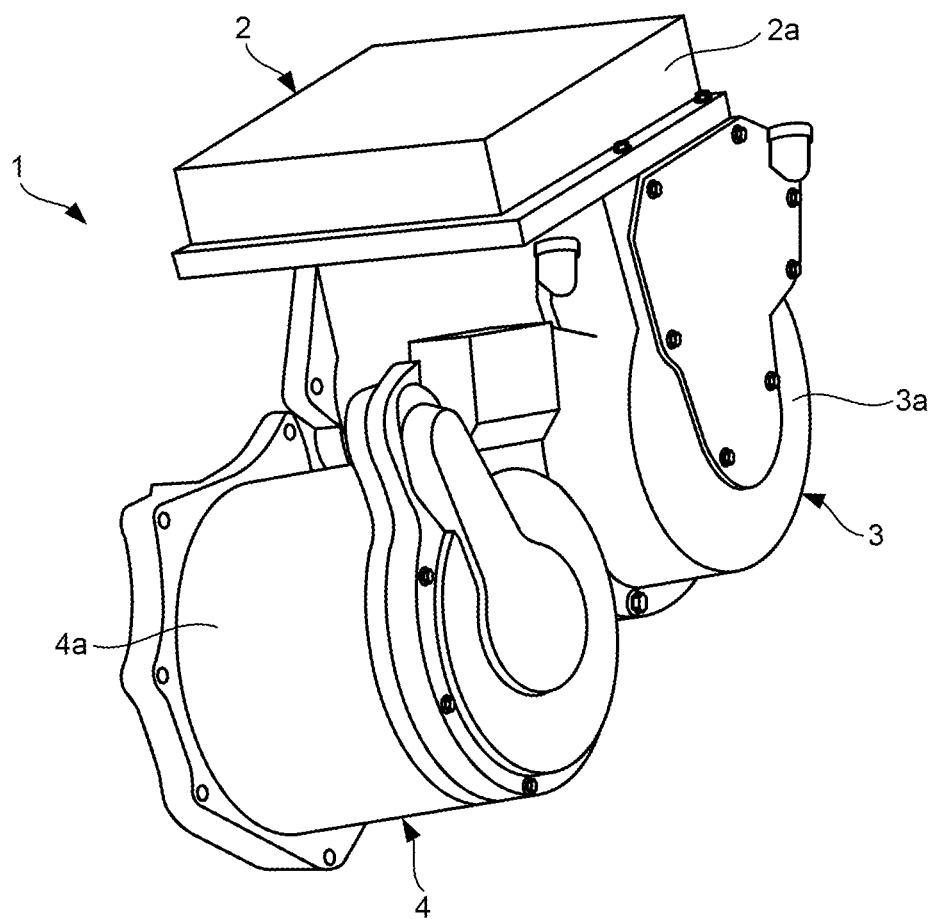
FIG. 1 is an external view of an electromotive unit.
Figure 2:
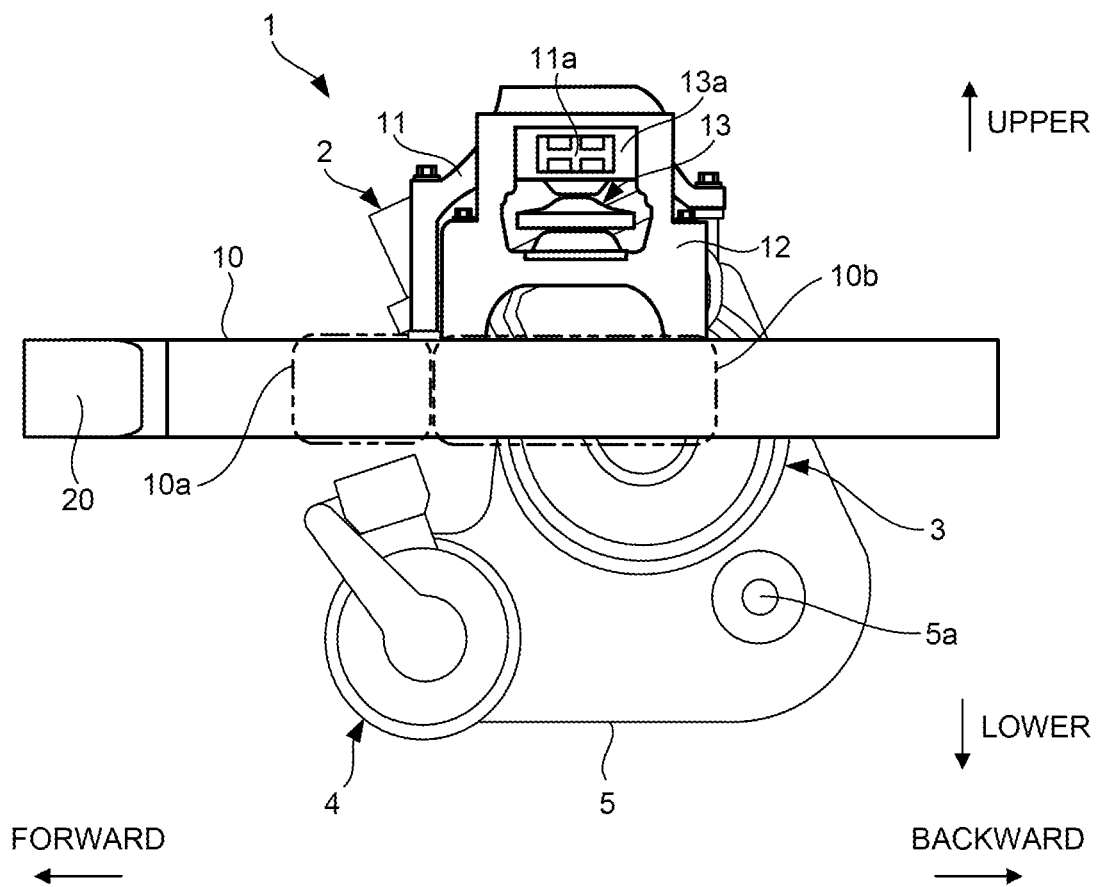
FIG. 2 is a diagram illustrating the electromotive unit at a fixed state.
Figure 3:
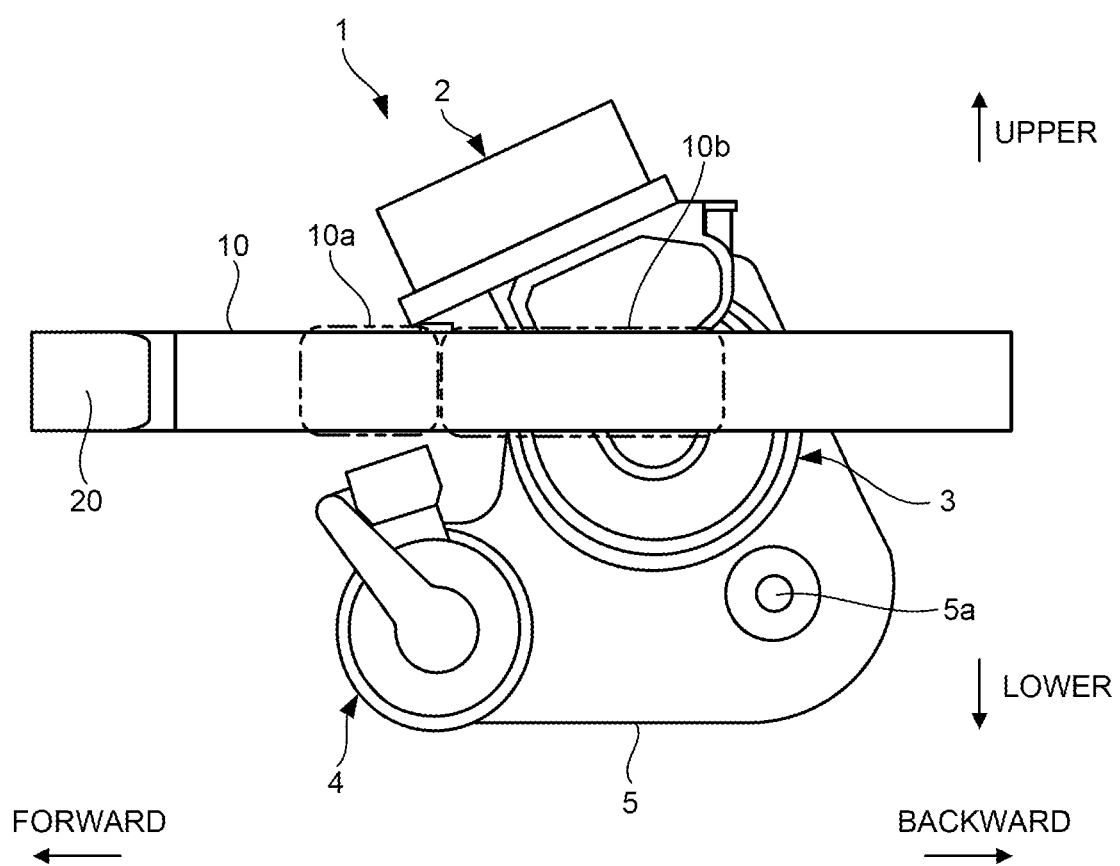
FIG. 3 is a schematic configuration diagram of an in-vehicle structure of an inverter according to an embodiment.

FIG. 1 is an external view of an electromotive unit 1. FIG. 2 is a diagram illustrating the electromotive unit 1 at a fixed state. FIG. 3 is a schematic configuration diagram of an in-vehicle structure of an inverter 2 according to the present embodiment. In FIG. 2, for the sake of clearer illustration, the electromotive unit 1 is shown by the thin lines. In FIG. 3, for the sake of clearer illustration, the in-vehicle structure of the inverter 2 is shown, omitting the fixed electromotive unit 1.

As illustrated in FIG. 1, the electromotive unit 1 includes the inverter 2, a motor 3, and a generator 4. The electromotive unit 1 is mounted on a vehicle. The vehicle is a series hybrid vehicle that travels by driving the motor 3, which constitutes the driving source of the vehicle, through utilizing electric power which is generated by the generator 4 using a power of an internal combustion engine. The inverter 2 is arranged above the motor 3 and is integrated with the motor 3. A case 2a of the inverter 2 is fixed to a case 3a of the motor 3 by bolt fastening.

As illustrated in FIG. 2 and FIG. 3, the electromotive unit 1 including the inverter 2 is arranged around a side member 10. The electromotive unit 1 is arranged to be tilted forward with respect to the vehicle. As illustrated in FIG. 3, the inverter 2 is arranged above the side member 10 and the generator 4 is arranged below the side member 10. The generator 4 is arranged in front of the motor 3 in the front-rear direction of the vehicle. The generator 4 is arranged at a position overlapping with a low rigidity portion 10a, which will be described later, in the front-rear direction of the vehicle. The motor 3 corresponds to the first motor, and the generator 4 corresponds to the second motor.

The electromotive unit 1 further has an multiplier-reducer 5 (increasing-reduction unit). The motor 3 and the generator 4 are respectively fixed to a case of the multiplier-reducer 5 by bolt fastening. Thereby, the inverter 2 is further integrated with the generator 4. The motor 3 transmits a driving power to an output shaft 5a via the reducer of the multiplier-reducer 5, and the driving power is transmitted to the drive wheels of the vehicle via the output shaft 5a. The power of the internal combustion engine is input to the generator 4 via the multiplier of the multiplier-reducer 5.

The side member 10 is connected to a bumper reinforce 20 on the front side of the vehicle and extends from the bumper reinforce 20 toward the rear of the vehicle. The side member 10 has the low rigidity portion 10a and a high rigidity portion 10b in the front-rear direction of the vehicle.

The low rigidity portion 10a has a vertically long cross-sectional shape when viewed from the front of the vehicle. Thus, the low rigidity portion 10a is easy to be bent in the lateral direction of the vehicle at the time of a vehicle collision. The vertically long cross-sectional shape contributes to securing a large space in a motor room of the vehicle.

The high rigidity portion 10b is a portion having a higher rigidity than the low rigidity portion 10a, and is arranged behind the low rigidity portion 10a. The high rigidity portion 10b is arranged contiguous to the low rigidity portion 10a. The high rigidity portion 10b is provided, for example, by using a material which has a larger cross-sectional structure and a higher strength than the low rigidity portion 10a, or by providing a beam inside the vehicle along the lateral direction of the vehicle, that is, on a portion of the inside of the side member 10.

As illustrated in FIG. 2, the electromotive unit 1 is fixed to the side member 10 by a first fixing bracket 11 and a second fixing bracket 12. The first fixing bracket 11 is fixed to the electromotive unit 1 by bolt fastening, and the second fixing bracket 12 is fixed to the side member 10 by bolt fastening.

The first fixing bracket 11 and the second fixing bracket 12 are connected by pressing a protruding connection portion 11a of the first fixing bracket 11 into an open end receiving portion 13a of a fluidic device 13 provided in the second fixing bracket 12. The fluidic device 13 is a fluid damper that suppresses vehicle vibration transmitting to the electromotive unit 1.

With this configuration, the electromotive unit 1 including the inverter 2 is mounted on the vehicle, being suspended from the side member 10. The electromotive unit 1 is fixed to the high rigidity portion 10b of the side member 10 via the second fixing bracket 12.

Figure 4:
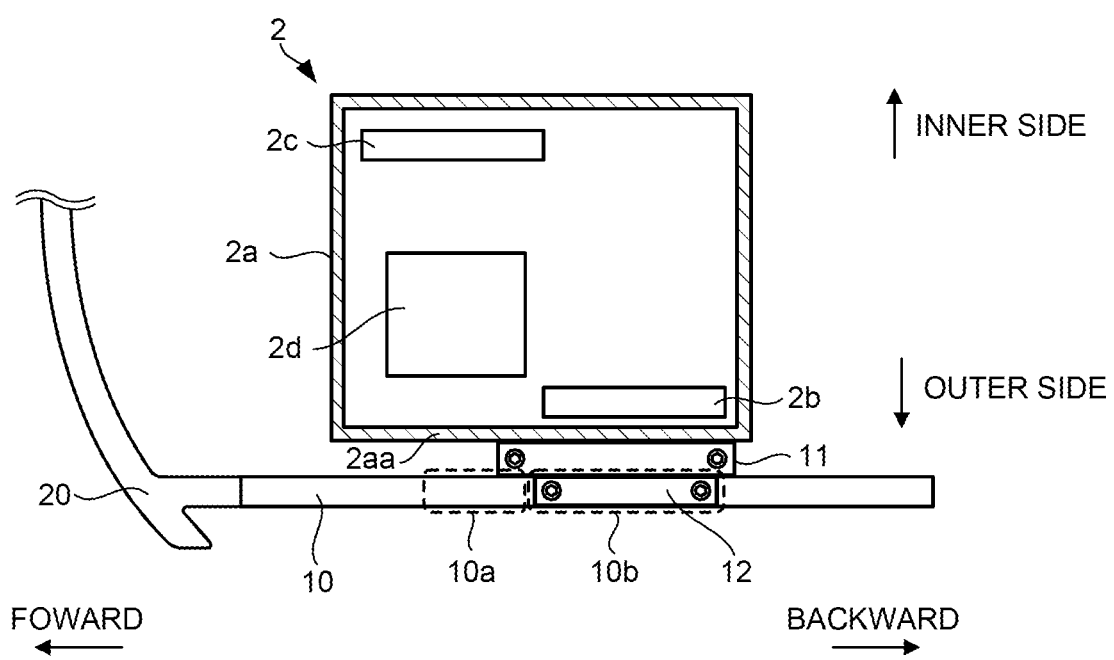
FIG. 4 is an explanatory diagram of a main part of the inverter.

FIG. 4 is an explanatory diagram of a main part of the inverter 2. FIG. 4 illustrates the side member 10, the first fixing bracket 11, the second fixing bracket 12 and the bumper reinforce 20 together with the inverter 2. For explanation of arrangements and the like, FIG. 4 shows the inverter 2 larger than the actual case shown in FIGS. 1 to 3. The inverter 2 has a first high-voltage bus bar 2b, a second high-voltage bus bar 2c, and a structure 2d in the case 2a.

The first high-voltage bus bar 2b connects with the motor 3, which is arranged more vehicle-backward than the generator 4. Thus, the first high-voltage bus bar 2b is arranged on a vehicle-rear side in the inverter 2. The first high-voltage bus bar 2b is arranged on a vehicle-outer side in the inverter 2. That is, the first high-voltage bus bar 2b is arranged closer to the side member 10 in the inverter 2. The first high-voltage bus bar 2b is provided such that the position thereof does not overlap with the low rigidity portion 10a in the front-rear direction of the vehicle. The first high-voltage bus bar 2b is arranged more vehicle-backward than the low rigidity portion 10a. The first high-voltage bus bar 2b is arranged at a position overlapping with the high rigidity portion 10b in the front-rear direction of the vehicle.

The second high-voltage bus bar 2c connects with the generator 4, which is arranged more vehicle-forward than the motor 3. Thus, the second high-voltage bus bar 2c is arranged on a vehicle-front side in the inverter 2. The second high-voltage bus bar 2c is arranged on a vehicle-inner side in the inverter 2. That is, the second high-voltage bus bar 2c is arranged in the inverter 2 away from the side member 10. The second high-voltage bus bar 2c is arranged more vehicle-forward than the high rigidity portion 10b. The second high-voltage bus bar 2c can be arranged at a position overlapping with the low rigidity portion 10a in the front-rear direction of the vehicle as shown in FIG. 4.

The second high-voltage bus bar 2c is arranged such that the structure 2d is located between the second high-voltage bus bar 2c and a wall portion 2aa, which is a wall portion of the case 2a on a vehicle-outer side along the lateral direction of the vehicle. The structure 2d is, for example, a smoothing capacitor or a power module component of a semiconductor element, and is a low-exposure structure with less electrode exposure than the second high-voltage bus bar 2c.

On the other hand, in the second high-voltage bus bar 2c, the high-voltage terminal has a bus bar structure, which is insulated only partially. Thus, the second high-voltage bus bar 2c is the most important component from the perspective of ensuring insulation in the inverter 2. The same is true for the first high-voltage bus bar 2b. The first high-voltage bus bar 2b corresponds to the high-voltage terminal connection portion. The first high-voltage bus bar 2b corresponds to the first high-voltage terminal connection portion, and the second high-voltage bus bar 2c corresponds to the second high-voltage terminal connection portion.

Figure 5:
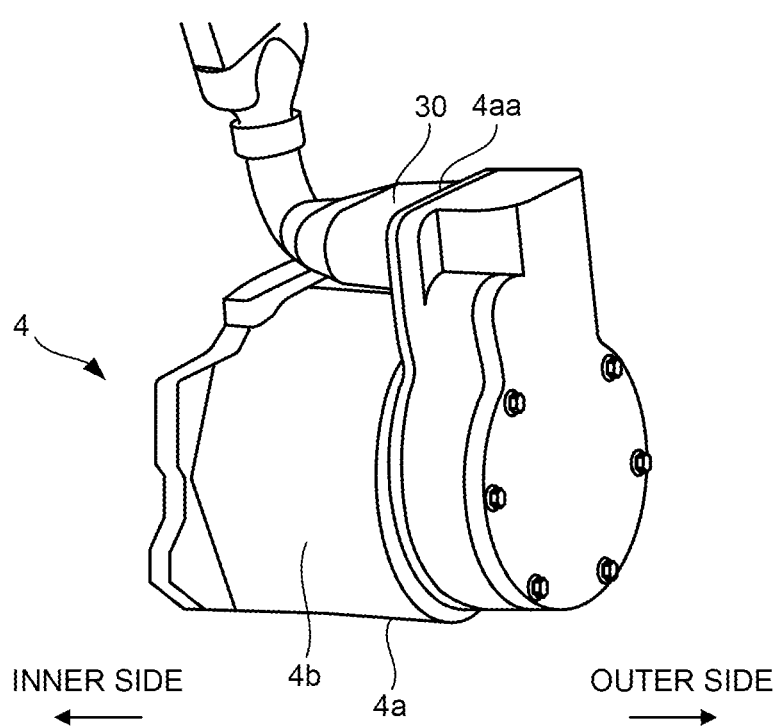
FIG. 5 is a diagram illustrating a generator as a single unit.

FIG. 5 is a diagram illustrating the generator 4 as a single unit. FIG. 5 illustrates the generator 4 with the end cover removed. A high-voltage connector 30 is provided in the generator 4. The generator 4 connects with the second high-voltage bus bar 2c via the high-voltage connector 30.

The high-voltage connector 30 connects with the generator 4 from the vehicle-inner side. Thus, the high-voltage connector 30 is located more vehicle-inward than a connection site 4aa of the high-voltage connector 30 provided on a case 4a of the generator 4. The high-voltage connector 30 is located above a motor portion 4b of the generator 4, which is the portion where a rotor and a stator are provided.

Next, major effects of the present embodiment will be described.

Figure 6:
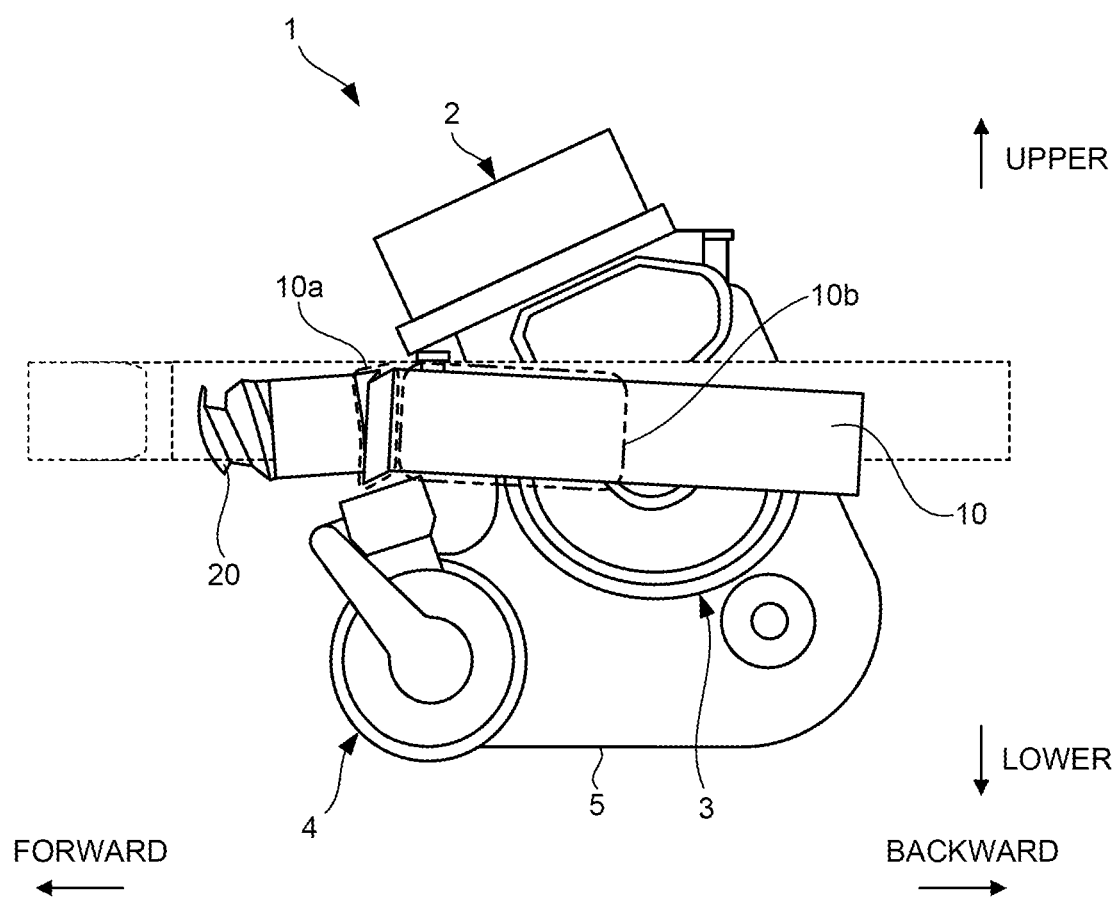
FIG. 6 is a diagram illustrating a state around the side member at the time of a vehicle collision.

FIG. 6 is a diagram illustrating a situation around the side member 10 at the time of a vehicle collision. The broken line indicates the state before the vehicle collision. When the vehicle collides, the low rigidity portion 10a of the side member 10 bends in the lateral direction of the vehicle to absorb the energy. At this time, a vehicle-forward side portion of the low rigidity portion 10a may bend toward the inner side of the vehicle and interfere with the inverter 2. If the insulation of the inverter 2 is destroyed at this time, a short circuit at a high voltage may occur and the safety in regard of protection against electric shock may be impaired.

The in-vehicle structure of the inverter 2 according to the present embodiment includes the inverter 2 and the side member 10, and as described above with FIG. 4, the inverter 2 is configured to have the first high-voltage bus bar 2b whose position in the front-rear direction of the vehicle does not overlap with the low rigidity portion 10a and overlaps with the high rigidity portion 10b.

According to such a configuration, even if the low rigidity portion 10a bends toward the inner side of the vehicle at the time of a vehicle collision, the low rigidity portion 10a is prevented from interfering with the first high-voltage bus bar 2b, which is one example of the high-voltage terminal connection portions that are most desired to avoid interference with the side member 10 from the viewpoint of ensuring insulation. Thus, according to such a configuration, it is possible to prevent dielectric breakdown of the inverter 2 due to the interference of the side member 10 at the time of a vehicle collision.

The in-vehicle structure of the inverter 2 according to this embodiment further includes the motor 3. The motor 3 is integrated with the inverter 2.

According to such a configuration, the inverter 2 and the motor 3 can be compactly integrated and arranged. Thus, it is easy to arrange the first high-voltage bus bar 2b at a position that does not interfere with the low rigidity portion 10a at the time of a vehicle collision, even if the overall layout in the motor room of the vehicle is restricted.

In the present embodiment, the size of the electromotive unit 1 is increased because the generator 4 is further integrated. In this case, there are restrictions on the layout in the front-rear direction of the vehicle, such as increase of the possibility that a part of the electromotive unit 1 is forced to be arranged at a position difficult to avoid interference with the low rigidity portion 10a which bends toward the inner side of the vehicle at the time of a vehicle collision.

Further, at the time of a vehicle collision, a force in the shearing direction acts on the first fixing bracket 11 and the second fixing bracket 12 to break them, and the electromotive unit 1 becomes free. Thus, even if the position of the motor 3 overlaps with the side member 10 in the vertical direction of the vehicle, the electromotive unit 1 including the motor 3 moves toward the inner side of the vehicle away from the side member 10 at the time of a vehicle collision. In addition, the generator 4 is generally smaller in size than the motor 3.

In light of such circumstances, the in-vehicle structure of the inverter 2 according to the present embodiment further includes the generator 4, and the generator 4 is integrated with the inverter 2. Further, the generator 4 is arranged in front of the motor 3 in the front-rear direction of the vehicle.

According to such a configuration, the generator 4 is arranged in front of the motor 3, and thus, even if the inverter 2 is further integrated with the generator 4, it is easy to arrange the first high-voltage bus bar 2b at a position that does not interfere with the low rigidity portion 10a at the time of a vehicle collision. In addition, according to such a configuration, it is also possible to avoid the destruction of the motor 3 due to the interference with the side member 10.

In the in-vehicle structure of the inverter 2 according to this embodiment, the inverter 2 is located above the side member 10.

According to such a configuration, the first high-voltage bus bar 2b and even the second high-voltage bus bar 2c can be protected from interference with the side member 10.

For example, when the inverter 2 is arranged to be tilted forward with respect to the vehicle, the low rigidity portion 10a tends to interfere with the vehicle-front portion of the inverter 2 at the time of a vehicle collision.

In the in-vehicle structure of the inverter 2 according to this embodiment, the inverter 2 has the second high-voltage bus bar 2c, and the second high-voltage bus bar 2c is arranged on a vehicle-inner side in the inverter 2.

According to such a configuration, even if the second high-voltage bus bar 2c is arranged at a position overlapping with the low rigidity portion 10a in the front-rear direction of the vehicle due to the existence of the first high-voltage bus bar 2b whose position in the front-rear direction of the vehicle does not overlap with the low rigidity portion 10a and overlaps with the high rigidity portion 10b, the second high-voltage bus bar 2c is arranged at a position where the load from the side member 10 is difficult to input. Thus, the insulation of the second high-voltage bus bar 2c can be secured, and the space can be saved safely. This is also applied when the second high-voltage bus bar 2c is actually arranged at a position overlapping with the low rigidity portion 10a in the front-rear direction of the vehicle.

In this embodiment, the second high-voltage bus bar 2c is arranged in the inverter 2 such that the structure 2d is located between the wall portion 2aa and the second high-voltage bus bar 2c.

According to such a configuration, the second high-voltage bus bar 2c can be difficult to destroy by means of the structure 2d preventing direct interference between the low rigidity portion 10a and the second high-voltage bus bar 2c at the time of a vehicle collision, and thus, it is easy to secure the insulation of the second high-voltage bus bar 2c at the time of a vehicle collision.

In this embodiment, the generator 4 is located below the side member 10.

According to such a configuration, even if the generator 4 is arranged in front of the motor 3 in the front-rear direction of the vehicle to be arranged at a position that overlaps with the low rigidity portion 10a in the front-rear direction of the vehicle, it is possible to prevent load input to the generator 4 or the high-voltage connector 30 at the time of a vehicle collision.

The in-vehicle structure of the inverter 2 according to this embodiment further includes the high-voltage connector 30 which is connected to the generator 4 from the vehicle-inner side.

According to such a configuration, since the high-voltage connector 30 is arranged on a vehicle-inner side in the lateral direction of the vehicle, it is also possible to avoid direct interference between the side member 10 and the high-voltage connector 30 at the time of a vehicle collision.

While the embodiments of the present invention have been described above, the above-described embodiments merely show a part of application examples of the present invention and are not intended to limit the technical scope of the present invention to the specific configurations of the above-described embodiments.

For example, the aforementioned embodiments have been described for the case where the first high-voltage bus bar 2b is the high-voltage terminal connection portion for which interference with the side member 10 is most desired to be avoided from the viewpoint of ensuring insulation. However, the high-voltage terminal connection portion, for example, may be a high-voltage bus bar that connects with a battery, and also may be a second high-voltage bus bar 2c that is modified to be arranged in the same manner as the first high-voltage bus bar 2b in the front-rear direction of the vehicle.

The aforementioned embodiments have been described for the case where the inverter 2 is integrated with the motor 3 and the generator 4. However, the inverter 2 may have a structure separate from the motor 3 and the generator 4, or may have a structure integrated with only one of the motor 3 and the generator 4.

The aforementioned embodiments have been described for the case where the inverter 2 is arranged above the side member 10. However, the inverter 2 may be partially arranged above the side member 10, and in this case, the portion of the inverter 2 above the side member 10 may include the first high-voltage bus bar 2b.

With such a configuration, it is also possible to prevent the low rigidity portion 10a from interfering with the first high-voltage bus bar 2b, which is an example of the high-voltage terminal connection portions that are most desired to avoid interference with the side member 10 from the viewpoint of ensuring insulation.

The invention claimed is:

1. An in-vehicle structure of an inverter, comprising:
    an inverter; and
    a side member having a low rigidity portion and a high rigidity portion in a front-rear direction of the vehicle, the high rigidity portion being arranged behind the low rigidity portion, wherein
    a part of the inverter overlaps with the low rigidity portion in the front-rear direction of the vehicle, and
    the inverter has a high-voltage terminal connection portion whose position in the front-rear direction of the vehicle does not overlap with the low rigidity portion and overlaps with the high rigidity portion.

2. The in-vehicle structure of inverter according to claim 1, further comprising:
    a motor, wherein
    of a first motor and a second motor, the motor includes at least the first motor;
    the first motor is integrated with the inverter; and
    the second motor is integrated with the inverter and arranged in front of the first motor in the front-rear direction of the vehicle.

3. The in-vehicle structure of inverter according to claim 2, wherein
    the high-voltage terminal connection portion includes a first high-voltage terminal connection portion connected to the first motor;
    the inverter is partially located above the side member; and
    the portion of the inverter located above the side member includes the first high-voltage terminal connection portion.

4. The in-vehicle structure of inverter according to claim 3, wherein
    the first high-voltage terminal connection portion is arranged more vehicle-backward than the low rigidity portion.

5. The in-vehicle structure of inverter according to claim 3, further comprising:
a second high-voltage terminal connection portion connected to the second motor, wherein
the second high-voltage terminal connection portion is arranged on a vehicle-inner side in the inverter.

6. The in-vehicle structure of inverter according to claim 5, wherein
the second high-voltage terminal connection portion is arranged more vehicle-forward than the high rigidity portion.

7. The in-vehicle structure of inverter according to claim 6, wherein
the second high-voltage terminal connection portion is arranged at a position overlapping with the low rigidity portion in the front-rear direction of the vehicle.

8. The in-vehicle structure of inverter according to claim 5, wherein
the second high-voltage terminal connection portion is arranged in the inverter such that a structure is located between the second high-voltage terminal connection portion and a wall portion of a case of the inverter that is a wall portion on a vehicle-outer side in the lateral direction of the vehicle.

9. The in-vehicle structure of inverter according to claim 2, wherein
the second motor is located below the side member.

10. The in-vehicle structure of inverter according to claim 2, further comprising:
a high-voltage connector connected to the second motor from a vehicle-inner side.

* * * * *